United States Patent
Baldwin et al.

(10) Patent No.: US 6,807,035 B1
(45) Date of Patent: Oct. 19, 2004

(54) FAULT INTERRUPTER USING MICROCONTROLLER FOR FAULT SENSING AND AUTOMATIC SELF-TESTING

(75) Inventors: John Richard Baldwin, Newtown, NY (US); Thomas James Batko, Wallingford, NY (US); David Francis Ellison, Westport, NY (US); Thomas Michael McDonald, Monroe, NY (US)

(73) Assignee: Hubbell Incorporated, Orange, CT (US)

( * ) Notice: Subject to any disclaimer, the term of this patent is extended or adjusted under 35 U.S.C. 154(b) by 603 days.

(21) Appl. No.: 09/722,423

(22) Filed: Nov. 28, 2000

(51) Int. Cl.[7] .............................................. H02H 3/00
(52) U.S. Cl. ............................ 361/42; 361/44; 361/45
(58) Field of Search ............................ 361/42, 44, 62, 361/64, 66, 78, 93.1, 100, 115, 45, 58

(56) References Cited

U.S. PATENT DOCUMENTS

| | | | |
|---|---|---|---|
| 3,403,238 A | 9/1968 | Buehler et al. ............. 337/393 |
| 3,629,766 A | 12/1971 | Gould, Jr. et al. .......... 337/239 |
| 3,683,302 A | 8/1972 | Butler et al. ................ 336/83 |
| 3,736,468 A | 5/1973 | Reeves et al. .............. 317/180 |
| 3,787,708 A | 1/1974 | Hobson, Jr. ................ 317/180 |
| 3,852,642 A | 12/1974 | Engel et al. ................ 317/180 |
| 3,859,567 A | 1/1975 | Allard ........................ 317/180 |
| 3,898,557 A | 8/1975 | Strock ........................ 324/51 |
| 3,936,699 A | 2/1976 | Adams ....................... 317/180 |
| 3,943,409 A | 3/1976 | Brown ........................ 317/90 |
| 4,002,951 A | 1/1977 | Halbeck ..................... 317/180 |
| 4,031,431 A | 6/1977 | Gross ......................... 307/326 |
| 4,051,544 A | 9/1977 | Vibert ......................... 361/45 |
| 4,216,515 A | 8/1980 | Van Zeeland ............... 361/45 |
| 4,216,516 A | 8/1980 | Howell ........................ 361/45 |
| 4,255,773 A | 3/1981 | Jabbal ........................ 361/45 |
| 4,353,103 A | 10/1982 | Whitlow ..................... 361/45 |
| 4,473,859 A | 9/1984 | Stone et al. ................. 361/93 |
| 4,549,241 A | 10/1985 | Morris et al. ................ 361/45 |
| 4,685,022 A | 8/1987 | Nichols, III et al. .......... 361/44 |
| 4,714,975 A | 12/1987 | Dvorak ........................ 361/44 |
| 4,742,422 A | 5/1988 | Tigges ......................... 361/45 |
| 4,816,957 A | 3/1989 | Irwin ........................... 361/45 |
| 4,829,390 A | 5/1989 | Simon ......................... 361/49 |
| 4,833,564 A | 5/1989 | Pardue et al. ................ 361/93 |
| 5,363,269 A | 11/1994 | McDonald .................... 361/45 |
| 5,394,289 A | 2/1995 | Yao et al. ..................... 361/42 |
| 5,459,630 A | 10/1995 | MacKenzie et al. .......... 361/45 |
| 5,475,609 A | * 12/1995 | Apothaker .................... 700/292 |
| 5,477,412 A | 12/1995 | Neiger et al. ................. 361/45 |
| 5,541,800 A | 7/1996 | Misencik ...................... 361/46 |
| 5,600,524 A | 2/1997 | Neiger et al. ................. 361/42 |
| 5,642,052 A | 6/1997 | Earle ........................... 324/556 |
| 5,706,155 A | 1/1998 | Neiger et al. ................. 361/45 |
| 5,715,125 A | 2/1998 | Neiger et al. ................. 361/42 |
| 5,729,417 A | 3/1998 | Neiger et al. ................. 361/45 |
| 5,844,759 A | * 12/1998 | Hirsh et al. ................... 361/42 |
| 5,943,198 A | 8/1999 | Hirsh et al. ................... 361/49 |
| 5,963,408 A | 10/1999 | Neiger et al. ................. 361/49 |
| 5,966,280 A | 10/1999 | Cerminara et al. ........... 361/47 |
| 5,973,896 A | 10/1999 | Hirsh et al. ................... 361/54 |
| 5,978,191 A | 11/1999 | Bonniau et al. .............. 361/45 |
| 6,040,967 A | 3/2000 | DiSalvo ........................ 361/42 |
| 6,052,265 A | 4/2000 | Zaretsky et al. .............. 361/42 |
| 6,111,733 A | 8/2000 | Neiger et al. ................. 361/45 |

FOREIGN PATENT DOCUMENTS

| | | | |
|---|---|---|---|
| DE | 4205208 | 8/1993 | ............ H02H/3/33 |
| WO | 0074192 | 5/2000 | ............ H02H/3/00 |

* cited by examiner

*Primary Examiner*—Stephen W. Jackson
(74) *Attorney, Agent, or Firm*—Stacey J. Longanecker; Alfred N. Goodman

(57) ABSTRACT

A fault interrupter having a microcontroller is provided to detect actual faults. The fault interrupter initiates a periodic self-test and provides external notification to the user upon successful or unsuccessful completion of the test. The fault interrupter generates the test signal at a selected time to substantially coincide with the zero-crossing of the AC power source. A manual test can also be performed using a manual test switch provided as a direct input to the microcontroller.

23 Claims, 4 Drawing Sheets

FAULT INTERRUPTER USING MICROCONTROLLER FOR FAULT SENSING AND AUTOMATIC SELF-TESTING

FIELD OF THE INVENTION

The present invention relates generally to a fault interrupter, particularly but not necessarily a ground fault circuit interrupter (GFCI), which utilizes a microprocessor to sense faults and to automatically test for proper function of the interrupter on a periodic basis, without the need for external intervention, and to disable the load circuit if an unsafe condition exists.

BACKGROUND OF THE INVENTION

Conventional GFCI devices are designed to trip in response to the detection of a ground fault condition at an AC load. Generally, the ground fault condition results when a person comes into contact with the hot side of the AC load and an earth ground at the same time, a situation which can result in serious injury. The GFCI device detects this condition by using a sensing transformer to detect an imbalance between the currents flowing in the hot and neutral conductors of the AC supply, as will occur when some of the current on the hot side is being diverted to ground. When such an imbalance is detected, a circuit breaker relay within the GFCI device is immediately tripped to an open condition, thereby opening both the hot and neutral sides of the AC line and removing all power from the load. Many types of GFCI devices are capable of being tripped not only by contact between the hot side of the AC load and ground, but also by a connection between the neutral side of the AC load and ground. The latter type of connection, which may result from a defective load or from improper wiring is potentially dangerous because it can prevent a conventional GFCI device from tripping at the intended threshold level of differential current when a line-to-ground fault occurs.

GFCI devices need to undergo periodic testing. Most GFCI devices can be manually tested for proper operation by means of a test further which, when depressed, simulates an actual ground fault by creating a momentary imbalance between the currents flowing in the hot and neutral conductors of the AC power supply. However, most users will use the manual test button occasionally or not at all. Therefore, proposals have been made for GFCI devices which carry out automatic self-tests on a periodic basis, without the need for user-intervention. However, the self-testing GFCI devices proposed so far do not have the ability to directly test for proper operation of the circuit breaker or relay contacts that are intended to remove power from the load in the event of a fault. If the contacts malfunction, power may continue to be available to the load although the GFCI device has taken the necessary steps to create an open circuit condition.

U.S. Pat. No. 5,600,524 discloses a ground fault circuit interrupter which incorporates a self test that attempts to check the state of the contacts. The self test involves briefly applying a small amount of current to the contacts through the trip coil. If this small amount of current is measured at the trip coil, the device assume that the trip coil and thus the contacts will function properly. However, a significant disadvantage to this type of indirect testing is that the current is not measured at the contacts themselves. Accordingly, there may still be current flowing through the contacts after a fault if they are welded closed, and the load will still be drawing power, resulting in a dangerous condition. This is despite the fact that the GFCI device has properly detected the fault and has attempted to create an open circuit condition at the load. Thus, a need exists for a means of directly testing the circuit breaker or relay contacts of a GFCI device to determine if they have opened and disabled power to the load.

In addition, U.S. Pat. No. 5,600,524 discloses complex circuitry to achieve self-testing, fault generation and fault testing. A need exists for less complicated circuitry, thus producing a more efficient and less costly method for ground fault circuit interruption.

SUMMARY OF THE INVENTION

In accordance with the present invention, a fault interrupter, such as a ground fault circuit interrupter (GFCI), an arc fault circuit interrupter (AFCI) or a combined GFCI/AFCI device, is provided that can automatically test its internal circuitry on a periodic basis, such as on a monthly, weekly, daily or even hourly basis.

Another aspect of the present invention is to provide a fault interrupter that detects actual imbalances in the load current using a microcontroller.

Another aspect of the present invention is to provide a fault interrupter which operations when a ground fault signal occurs, the load is opened substantially coincident with a zero-crossing of the AC power source.

Another aspect of the present invention is to provide a fault interrupter in which manual testing is accomplished by pushing a manual test button, thus initiating a driver circuit which generates a fault. The fault is sensed by a sense transformer that has an input into the microcontroller, which activates a load relay to an open condition.

An additional aspect of the present invention is to provide a fault interrupter in which the manual test button is a direct input to a microcontroller. When the microcontroller receives such an input, it generates an imbalance in the load current and activates the load relay to an open condition.

Yet another aspect of the present invention is to provide a fault interrupter with the ability to detect when it has been incorrectly wired, that is, when line and load connections have been reversed. Upon detection of a miswiring condition, a visual and/or audible alarm is triggered to alert the user, and the load contacts are opened removing power from downstream electrical devices.

In accordance with yet another aspect of the present invention, a periodic test reminder signal is provided to alert the user to manually test the fault interrupter. A visual and/or audible alert signal can be generated 30 days after power was initially applied or 30 days after the last manual test was performed. A daylight detector can be included to silence the test reminder signal during evening and nighttime hours.

In accordance with another aspect of the present invention, the microcontroller creates a closed circuit condition if the load circuit becomes open through some eternal shock or vibration.

The foregoing aspects are substantially achieved by a circuit interrupter apparatus for detecting faults connected to a line monitoring device and a line interrupter circuit. The circuit interrupter apparatus is comprised of a microcontroller connected to a line monitoring device and to a line interrupter circuit, the microcontroller being programmable to receive and process inputs from the line monitoring device to determine the occurrence of a fault in the load, and to operate the line interrupter circuit when a fault is detected.

Another aspect is substantially achieved by a circuit interrupter apparatus for detecting faults in a load connected to a line monitoring device and a line interrupter circuit, wherein the circuit interrupter apparatus comprises a microcontroller and a manual test device. The microcontroller is connected to the line monitoring device and to the line interrupter circuit and the microcontroller is programmable to receive and process inputs from the line monitoring device to determine the occurrence of a fault in the load and to operate the line interrupter circuit when a fault is detected.

The manual test device comprises a manual test switch connected to a driver circuit, the driver circuit being connected to the line monitoring device and being operable in response to activation of the manual test switch to induce a fault condition that is detected by the line monitoring device and indicated to the microcontroller by the inputs.

Another aspect of the present invention is substantially achieved by a circuit interrupter apparatus for detecting faults in a load connected to a line monitoring device and a line interrupter circuit wherein the circuit interrupter apparatus comprises a microcontroller and a manual test switch. The microcontroller is connected to the line monitoring device and to the line interrupter circuit, and the microcontroller is programmable to receive and process inputs from the line monitoring device to determine the occurrence of a fault and to operate the line interrupter circuit when a fault is detected. The manual test switch is connected to an input port of the microcontroller which is programmable to operate the line interrupter circuit in response to activation of the manual test switch.

Another aspect of the present invention is substantial achieved by a circuit interrupter apparatus for detecting faults in a load connected to a line monitoring device and a line interrupter circuit. The circuit interrupter apparatus comprises a microcontroller connected to the line monitoring device and to the line interrupter circuit. The microcontroller is programmable to receive and process inputs from the line monitoring device to determine if the line is in open state due to an external condition not relating to the load, and to operate the line interrupter circuit in order to close the line when the open state is detected.

BRIEF DESCRIPTION OF THE DRAWINGS

These and other objects, advantages and novel features of the invention will be more readily appreciated from the following detailed description when read in conjunction with the accompanying drawings, in which.

Throughout the drawings, like reference numerals will be understood to refer to like parts and components.

DETAILED DESCRIPTION OF THE PREFERRED EMBODIMENTS

Figure 1:
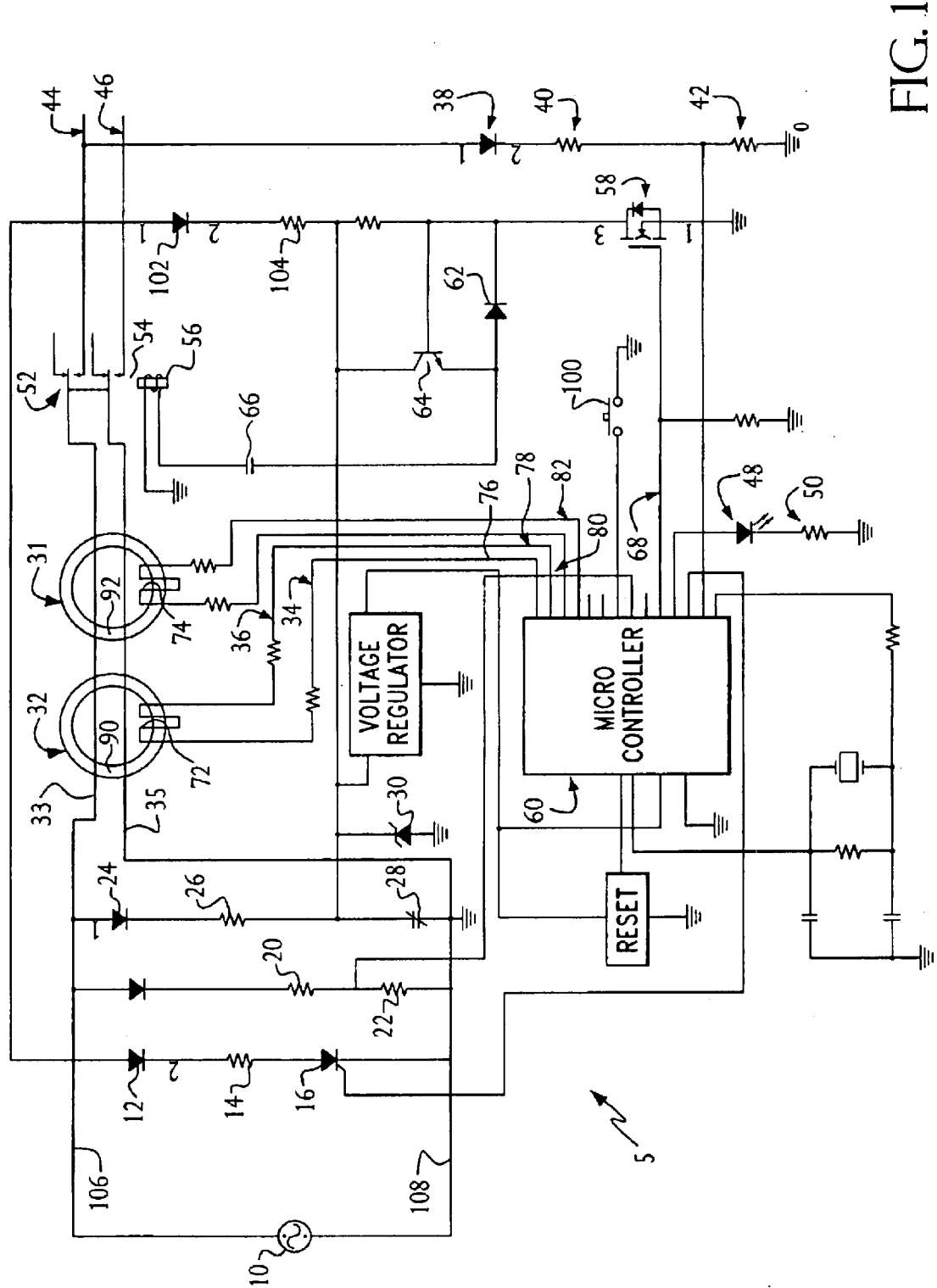
FIG. 1 is a schematic diagram of a GFCI device employing a latching relay and constructed in accordance with a first embodiment of the present invention.

FIG. 1 illustrates a ground fault circuit interrupter (GFCI) device 5 constructed in accordance with a first embodiment of the present invention. The voltage source 10 (e.g. a 120 volt AC power supply) is connected in series with a diode 12, a resistor 14, and an SCR 16. These components are connected in series with the resistors 20 and 22. As further explained below, the resistors 20 and 22 allow a microcontroller 60 to trip the GFCI device when the input voltage is close to the zero-crossing of the incoming voltage from the voltage source 10. Modified components can be used instead of the configuration of FIG. 1 to monitor line zero current cross and thus operate the contacts 52 and 54 near the line zero current cross. The microcontroller 60 is preferably a Microchip PIC 16C620A, 621A or 622A type of integrated circuit chip. SCR 24, a resistor 26 and a capacitor 28 are in series with each other and in parallel with a zener diode 30. These components create a smooth DC input for the microcontroller 60. A sense transformer 32 is connected in series with the resistors 34 and 36, and is further connected as an input to the microprocessor 60 on lines 76 and 78. An additional input to the microcontroller 60 is comprised of a diode 38, and two resistors 40 and 42. These components are coupled with the load terminals 44 and 46, thus allowing the microcontroller 60 to detect if a current exits at the load terminals 44 and 46. The microcontroller 60 has an additional output comprising a light emitting diode (LED) 48 and a resistor 50. As explained in detail below, this allows for external notification of self-tests, malfunctions or other results.

With continued reference to FIG. 1, the operation of the GFCI device 5 will now be described. The AC power source 10 supplies power to the load. If an imbalance in the load occurs, that is, the current to the hot line 33 is not equal and opposite to that on the neutral line 35, the sense transformer 32 sends an analog signal to the microcontroller 60, which in turn produces a digital signal to drive the FET 58. The FET 58 is turned on, thereby actuating the latching relay 56 to create an open circuit condition by opening the contacts 52 and 54. It is important to note that the outputs 76 and 78 of sense transformer 32 are analog signals directly into the microcontroller 60. The typical ground fault chip of the microcontroller 60 can be eliminated by making a delta-sigma converter using one of the microcontroller's 60 analog comparators and one of the microcontroller's 60 analog input/outputs, preferably line 76 or 78.

Additional if the GFCI device 5 is put into an open circuit condition in the absence of a fault due to a shock or vibration, the microcontroller 60 directly senses this open condition and doses the contacts 52 and 54 by activating the latching relay 56. Closing of the contacts 52 and 54 is accomplished by the microcontroller 60 sending a signal via line 68 to turn on the FET 58, which is in series with diode 62. Accordingly, the current flows from the collector to the emitter of the transistor 64, thereby driving the latching relay 56 and creating a closed circuit condition at the load 44 and 46.

The GFCI device 5 preferably operates in at least three different modes; a self-test mode, an actual fault mode, and a manual test mode. The self-test mode is initiated automatically and periodically by the microcontroller 60, which provides an approximately 8 milliamp ground fault signal to gate the SCR 16, thus drawing current through resistor 14 and inducing an imbalance in current flow on line 33. The sense transformer 32 sends a signal through the resistor 36 via line 78 to the microcontroller 60 which, in turn, sends an output on line 68 to the latching relay 56. Line 68 of microcontroller 60 is connected to the FET 58. The FET 58 gates and activates the latching relay 56 to open the contacts 52 and 54 for a short amount of time, preferably less than 25 msec. An open condition at the load terminals 44 and 46 is therefore created for a minimal duration so as not to disturb any load that is connected, yet allowing the GFCI device 5 to perform the self-test. Further, the microcontroller 60 monitors the zero-crossing of the voltage waveform of the AC power source 10. By initiating the self-test at this point, the contacts 52 and 54 can open without arcing, thus extending their life. In addition, the microcontroller 60 also tests directly for the opening of contacts 52 and 54. For example, if the contacts 52 and 54 opened properly, the microcontroller 60 should not be receiving any current input through resistor 40 and diode 38 since the load is no longer connected to the source. The microcontroller 60 monitors for this condition, and alerts the user through LED 48 if it is receiving current. Once the microcontroller 60 completes the self-test, it initiates the external notification to alert the user that a successful or unsuccessful test is complete. The notification can be an LED 48 or an audible signal or both. Further, LED 48 can function in various modes, for example either slowly flashing or rapidly flashing. As one option, the LED 48 will flash slowly, and possibly produce an audible indication, if the GFCI device 5 has not been manually tested for proper operation of the contacts 52 and 54 within a prescribed time (e.g. monthly, weekly, or daily). In addition, if the GFCI device 5 is non-functioning, the user can be alerted visually, audibly or both, by a rapidly flashing LED 48.

The test button 100 can be used for multiple functions. The microcontroller 60 operates the contacts 52 and 54 in response to the test button 100. When the user pushes test button 100, the microcontroller 60 opens the contacts 52 and 54 of the lathing relay 56, thus opening the load at terminals 44 and 46, respectively. The opened contacts mode is communicated to the user by a rapidly or slowly flashing LED 48. Pushing the test button 100 a second time resets the GFCI by closing the contacts, and stops the flashing of the LED 48. If the contacts 52 and 54 fail to open when the test button is pushed the first time, the microcontroller 60 detects this condition and continues to flash the LED 48 rapidly to indicate a non-functioning GFCI device 5. The test button 100 can be pushed for a longer period of time to conduct the self test, as detailed below.

Figure 2:
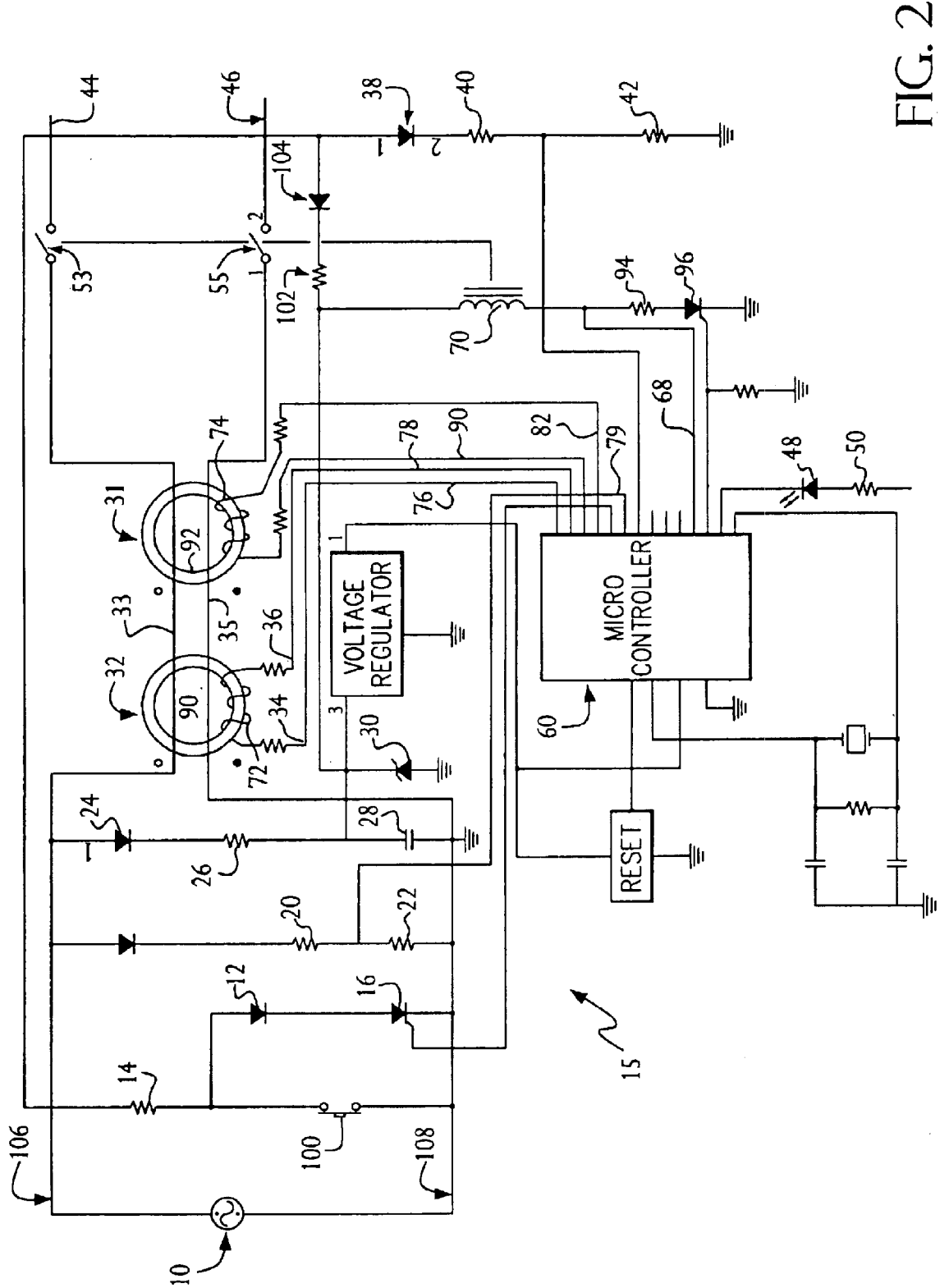
FIG. 2 is a schematic diagram of a GFCI device employing a solenoid-actuated circuit breaker and constructed in accordance with a second embodiment of the present invention.

FIG. 2 illustrates a GFCI device in accordance with a second embodiment of the present invention. The primary difference between FIGS. 1 and 2 is the use of the latching relay 56 of FIG. 1 and the circuit breaker solenoid 70 of FIG. 2. In order to detect a ground fault condition, the GFCI device 15 of FIG. 2 includes a sense transformer 32 through which the AC line and neutral conductors 33 and 35 extend as primary windings. The conductors 33 and 35 also extend as primary windings through an additional transformer 31 which operates as a grounded neutral transformer. The secondary winding 72 of the sense transformer 32 is connected across inputs 76 and 78 of the microprocessor 60. The secondary winding 74 of the grounded neutral transformer 31 is connected across inputs 80 and 82 of the microprocessor 60. As mentioned above, the ground fault chip of the microcontroller 60 can be eliminated using one of the microcontroller's 60 analog comparators and one of the microcontrollers 60 analog input/outputs, preferably lines 80 and 82. In operation, the sense transformer 32 operates as a differential transformer for detecting a current leakage to ground between the load 44 and an earth ground. The grounded neutral transformer 31 detects current leakage to ground between the load 44 and earth ground. If there is no fault condition, then the current will flow through primary windings 33 and 35 with no net flux detected by the core 90 of the sense transformer 32 and the core 92 of the grounded neutral transformer 31. However, if a fault occurs between the hot 44 and neutral lines 46, then the cores 90 and 92 sense a net flux which creates a potential at the outputs 76 and 78 of the sense transformer 32 and 80 and 82 of the grounded neutral transformer 31. These signals are inputs to the microcontroller 60, which energizes the solenoid 70 by means of the resistor 94 and a SCR 96. The solenoid 70 opens the circuit breaker contacts 53 and 55, thus creating an open circuit condition at the load.

Having described the actual fault mode above, the self-test mode of FIG. 2 will now be discused. The automatic self-test is performed electronically by the microcontroller 60 at some prescribed period of time (e.g., daily, weekly, monthly). Microcontroller 60 electronically produces a ground fault signal, preferably 8 ma (half-wave), on line 79 as an input to SCR 16, thus causing it to gate. This in turn produces a net flux between windings 33 and 35, which is further detected by the core 90 of the sense transformer 32 and the core 92 of the grounded neutral transformer 31. This condition crates a potential at the outputs 76 and 78 of the sense transformer 32, as well as outputs 80 and 82 of the grounded neutral transformer 31. These signals are inputs to the microcontroller 60, which energizes the solenoid 70 by means of the resistor 94 and a SCR 96. The solenoid 70 opens the contacts 53 and 55.

In addition to the self-test and actual fault modes discussed above, the user can perform a manual test. The user depresses a test button 100 that is an input to the microcontroller 60, as seen in FIG. 1. The microcontroller 60 then generates a signal on line 68 and drives the latching relay 56, as detailed above. In the embodiment of FIG. 2, the user of the GFCI device 15 can also perform a manual test by depressing test button 100, thereby creating a shunt across SCR 16 and drawing current through resistor 14 to create an imbalance in the load. The manual test mode occurs preferably during the zero crossing of the AC input voltage waveform in order to send the life of the contacts and to prevent arcing across the relay contacts 52 and 54 of FIG. 1 and the circuit breaker contacts 53 and 55 of FIG. 2.

In addition, the manual test occurs at the line zero crossing to allow minimal current to flow through to the latching relay 56 of FIG. 1, thus preventing its operation so as not to disturb the load at the terns 44 and 46. As mentioned previously, more sophisticated circuitry is used to monitor line current zero crossing and operate the contacts 52 and 54 of FIG. 1 and the contacts 53 and 55 of FIG. 2 near the line current zero cross. During a manual test, the microcontroller 60 determines if the contacts 53 and 55 of FIG. 2 have opened. If microcontroller 60 senses current by means of the SCR 38 and resistor 40, then contacts 53 and 55 have malfunctioned and are still dosed. Energization of an LED 48 or generation of an audible signal, or both, are performed to notify the end-user.

The GFCI devices of FIGS. 1 and 2 contain a reverse line load detector. This detector allows the microcontroller 60 of both embodiments to have substantially continuous power despite miswiring by the outlet installer. The microcontroller 60 is therefore able to notify the end-user of the incorrect wiring. A miswiring occurs when the installer connects the AC source lines 106 and 108 directly to the load lines 44 and 46, bypassing the GFCI device. This condition is not apparent to the user because there is still power at the load. Further, if the test button is depressed, current will flow creating a current imbalance between hot line 106 and neutral line 108 sensed by transformer 32 In FIG. 1, the microcontroller will operate the latching relay 56 to open the contacts 52 and 54. In FIG. 2, the microcontroller 60 energizes the solenoid 70, thus opening circuit breaker contacts 53 and 55. To avoid the appearance to the end user that a proper GFCI device test has been completed, the microcontroller 60 alerts the user of the miswiring using the LED 48 or an audible signal or both. The microcontroller 60 is able to do this because it is continually receiving power despite the electronics being bypassed by the installer. Therefore, as the microcontroller 60 performs a self-test it will not receive a signal from the transformers 90 and 92, and thus realize a miswiring has occurred.

Figure 3:
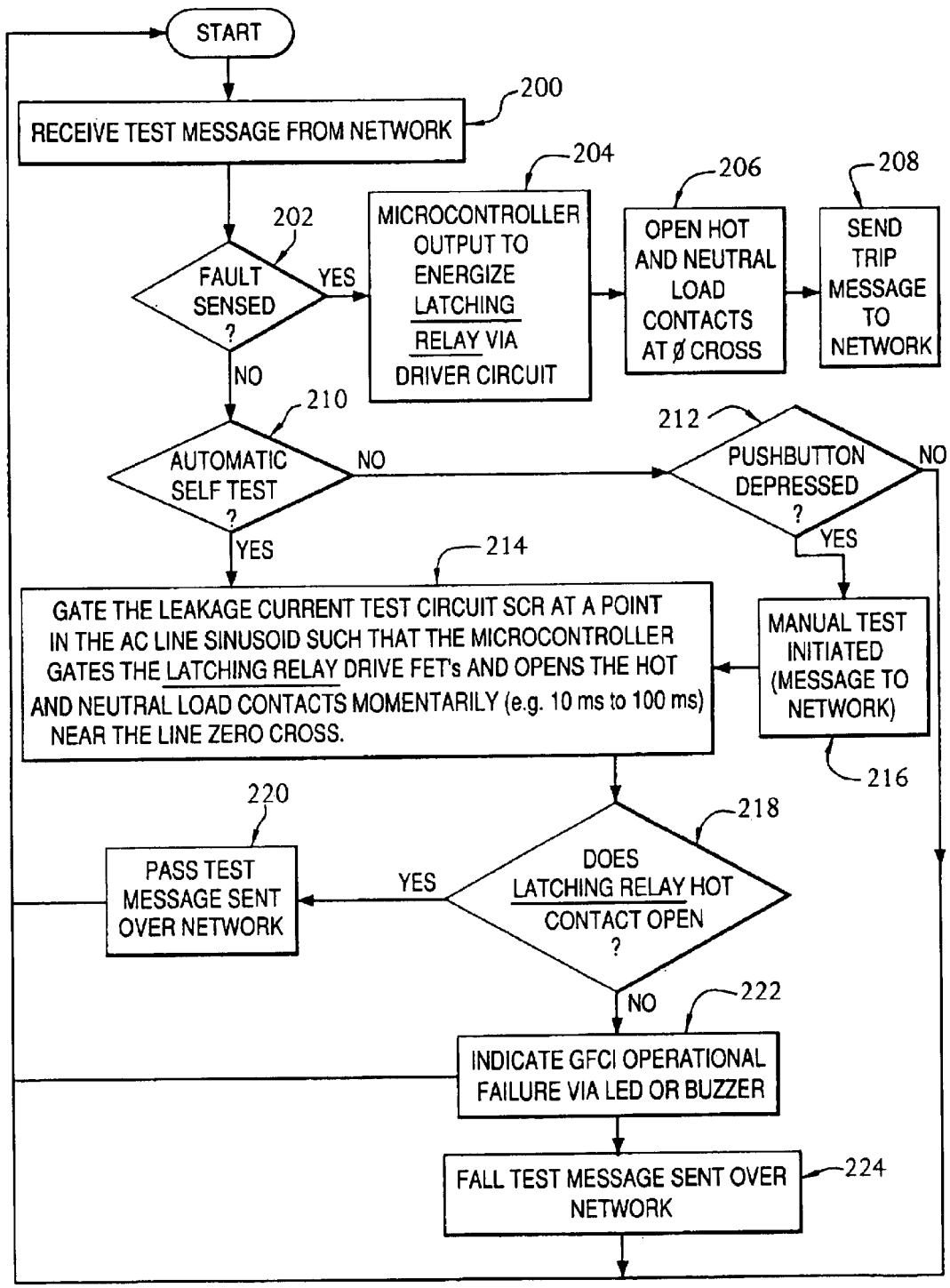
FIG. 3 is a flow chart illustrating a sequence of operations of a GFCI device using a latching relay in accordance with the first of the present invention.
Figure 4:
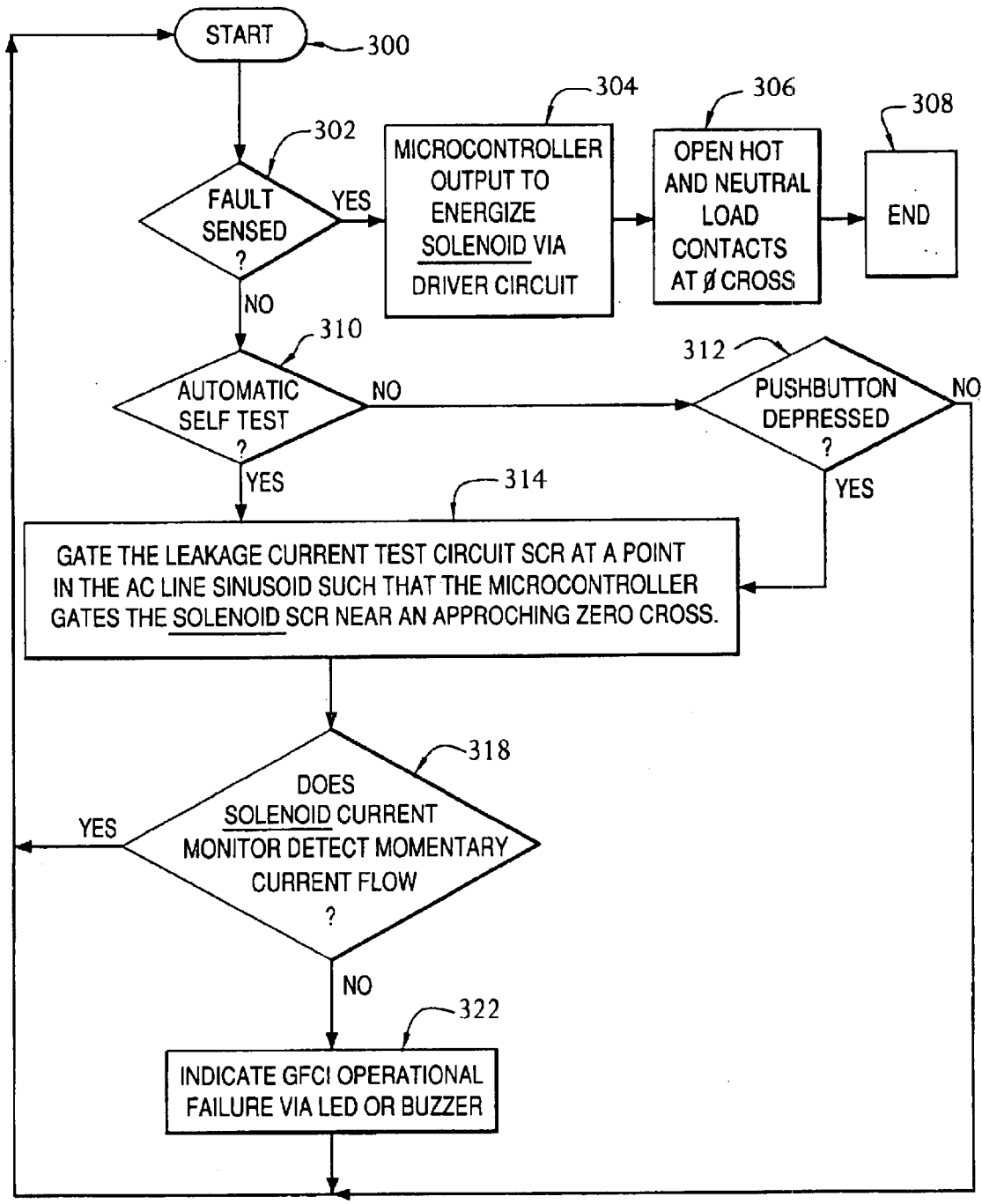
FIG. 4 is a flow chart illustrating a sequence of operations of a GFCI device using a solenoid-actuated circuit breaker in accordance with the second embodiment of the present invention.

FIGS. 3 and 4 describe the operation of the microcontroller 60 when performing a self-test or a manual test, or detecting an actual fault. In FIG. 3, the microcontroller 60 receives an input 200 from the sense transformer 32. The microcontroller 60 determines if one of three situations has occurred: an actual fault 202, an automatic self-test 210, or a manual test 212. If there is an actual fault, the microcontroller 60 outputs a signal to energize the latching relay 56, or the solenoid 70, as seen in 204 of FIG. 3 and 304 of FIG. 4, respectively. The open contacts create an open circuit condition at the hot and neutral load/contacts at 206, and a signal is sent to the network indicating that the contacts are opened at 208.

The self-test mode and the manual test mode are similar. However, as seen in FIG. 1, the manual test button 100 is a direct input into the microprocessor 60. Therefore, in FIG. 3, the microprocessor 60 sends an output to gate the FET 58. In FIG. 4, on the other hand, depressing the test button 100 creates a shunt which in turn gates the SCR 16. As stated previously, the microcontroller 60 notes the imbalance and operates the relay 56 or the solenoid 70. For the solenoid 70, as seen in FIG. 4 (block 318), the test occurs just before the zero-crossing of the incoming voltage from the AC source 10 so that there is not enough energy to activate the solenoid, yet enough to draw current through the solenoid 70. Thus, if the microcontroller 60 detects a small amount of current through the contacts 52 and 54, then the GFCI device 15 has been successfully tested. If the microcontroller 60 does not detect a small amount of current, then external notification is given to indicate that the test was unsuccessful at 322. When latching relay 56 of FIG. 1 is used, the microcontroller 60 monitors the current on the load 44 and 46. If there is no current, the contacts 52 and 54 have opened. If there is current, then the contacts 52 and 54 have not opened and the load terminals 44 and 46 are still connected to the source. Accordingly, the microcontroller 60 sends a failure message by activating an LED 48 or generating an audible signal as shown in block 222.

Preferred values for the electrical components used in the GFCI devices of FIGS. 1 and 2 are provided in Table 1 below. Resistor values are expressed in ohms (Ω), kilohms (K), or megaohms (M). Capacitor values are expressed in microfarads ($\mu F$). Table 1 also expresses the preferred part numbers for the diodes, the FET and the bipolar transistor of FIGS. 1 and 2.

TABLE 1

| Component | Value |
| --- | --- |
| Resistors 34, 36, 42, 50 | 1 K |
| Resistor 14 | 15 K |
| Resistors 26, 22, 102, 104 | 100 K |
| Resistor 40 | 1 M |
| Capacitor 28 | 220 $\mu F$ |
| Capacitor 66 | 10 $\mu F$ |
| Diodes 12, 24, 38, 102 | 1N4007 |
| Diode 62 | 1N4148 |
| Zener Diode 30 | 1N4699 |
| FET 58 | VN2222LL |
| transistor 64 | 2N2222A/ZTX |

In standard GFCI devices, the sense transformer is used to detect load hot to line neutral current which ranges from approximately 4 ma to 6 ma. The grounded neutral transformer is used to detect load neutral to line neutral leakage current, typically ranging from 4 ma to 6 ma. The grounded neutral transformer is used to detect load neural to line neutral leakage current, typically a minimum of 1.2 ma. A GFCI device can be constructed to use a single transformer to perform both functions. The leakage current from load hot to line neutral generates a sense transformer output voltage which is out of phase with the line hot voltage. Similarly, the leakage current from load neutral to line neutral generates a sense transformer output voltage that is in phase with the line hot voltage. Using the microcontroller 60 to detect the phase of the sense transformer it can be determined whether the leakage current comes from load hot to line neutral, or the load neutral to line neutral thereby using only one transformer as opposed to two.

The above discussion has focused on ground fault circuit interruption. It is important to note that both embodiments of the present invention are applicable to an arc fault circuit interrupter as well. Arc faulting occurs when anomolous currents indicative of arcing are present between two electrical conductors or between an electrical conductor and ground. Arc faulting and ground faulting can occur in situations.

Although only two exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A circuit interrupter apparatus for detecting faults in a load connected to a line monitoring device and a line interrupter circuit, said circuit interrupter apparatus comprising:

a microcontroller connected to said line monitoring device and to said line interrupter circuit, said microcontroller being programmable to receive and process inputs from said line monitoring device to determine the occurrence of a ground fault in said load, to operate said line interrupter circuit when said ground fault is detected.

2. A circuit interrupter apparatus for detecting faults in a load connected to a line monitoring device and a line interrupter circuit, said circuit interrupter apparatus comprising:

a microcontroller connected to said line monitoring device and to said line interrupter circuit, said microcontroller being programmable to receive and process inputs from said line monitoring device to determine the occurrence of a ground fault in a load, and to operate said line interrupter circuit when said ground fault is detected; and a manual test device comprising a manual test switch connected to a driver circuit, said driver circuit being connected to said line monitoring device and being operable in response to activation of said manual test switch to induce a fault condition that is detected by said line monitoring device and indicated to said microcontroller by said inputs.

3. A circuit interrupter apparatus as claimed in claim 1 or 2, wherein said load is connected to an AC power source and further comprising detector circuitry configured to open said load thereby generating said ground fault signal at a selected time which is substantially coincident with a zero-crossing of said AC power source, said ground fault signal being provided to said microcontroller to operate said line interrupter circuit and thereby remove power from said load, said microcontroller being programmable to directly monitor said line interrupter circuit, and then initiate said line interrupter circuit to restore power at a selected time relative to a zero-crossing of said AC power source.

4. A circuit interrupter apparatus as claimed in claim 1 or 2, wherein a load is connected to an AC power source and further comprising detector circuitry configured to open said load thereby generating said ground fault signal at a selected time which is substantially coincident with a zero-crossing of said AC power source, said ground fault signal being provided to said microcontroller to operate said line interrupter circuit, said microcontroller's output comprising sufficient current to test said detector circuitry, but insufficient to activate said line interrupter circuit.

5. A circuit interrupter apparatus as claimed in claim 1 or 2, for detecting faults in a load connected to a line monitoring device and a line interrupter circuit, said interrupter apparatus comprising:

an indicator; and a microcontroller connected to said line monitoring device, said line interrupter circuit and said indicator, said microcontroller being programmable to receive and process inputs from said line monitoring device to determine the occurrence of a fault, and to operate said line interrupter circuit when said fault is detected; wherein said microcontroller is further programmable to operate said indicator to provide notification upon detection by said microcontroller of the occurrence of at least one of a plurality of conditions comprising: successful completion of a self-test, successful completion of a manual test, unsuccessful completion of said self-test, unsuccessful completion of said manual test, the need for a user to initiate said manual test, testing of said line interrupter to ensure proper function thereof, and testing power to said microcontroller to determine whether a reverse line load condition exists.

6. A circuit interrupter apparatus as claimed in claim 5, wherein said indicator comprises an LED.

7. A circuit interrupter apparatus as claimed in claim 1 or 2, for detecting faults in a load connected to a line monitoring device and a line interrupter circuit, said circuit interrupter apparatus comprising:

a microcontroller connected to said line monitoring device and to said line interrupter circuit, said microcontroller being programmable to receive and process inputs from said line monitoring device to determine the occurrence of said fault, and to operate said line interrupter circuit when said fault is detected; and a reverse line load detector circuit coupled to said microcontroller to ensure that said microcontroller is receiving power.

8. A circuit interrupter apparatus as claimed in claims 1 or 2, wherein:

said microcontroller is programmed to perform at least one self-test wherein said microcontroller operates said line interrupter circuit regardless of said inputs, said ground fault circuit interrupter apparatus conducting said at least one self-test by said microcontroller initiating said fault, said line monitoring device detecting said fault, and said line monitoring device sending an input to said microcontroller wherein said microcontroller initiates said line interrupter circuit.

9. A circuit interrupter apparatus for detecting faults in an electrical load connected to a line monitoring device and a line interrupter circuit, comprising:

a contact detector apparatus comprising a sensing circuit coupled to said line interrupter circuit, said sensing circuit having an input to said microcontroller wherein said microcontroller is operable to detect whether a signal is present at said line interrupter circuit indicating that said line interrupter circuit is closed, or whether said signal is not present indicating that said line interrupter circuit is open.

10. A circuit interrupter apparatus for detecting faults in a load connected to a line monitoring device and a line interrupter circuit, the circuit interrupter apparatus comprising:

a microcontroller connected to said line monitoring device and to said line interrupter circuit, said microcontroller being programmable to receive and process inputs from said line monitoring device to determine the occurrence of a fault, and to operate said line interrupter circuit when said fault is detected; and a manual test switch connected to an input port of said microcontroller, said microcontroller being programmed to operate said line interrupter circuit in response to activation of said manual test switch.

11. A circuit interrupter apparatus for detecting faults in a load connected to a line monitoring device and a line interrupter circuit, said circuit interrupter apparatus comprising:

a microcontroller connected to said line monitoring device and to said line interrupter circuit, said microcontroller being programmed to receive and process inputs from said line monitoring device to determine if said load is in open state due to an external condition not relating to the load, and to operate said line interrupter circuit in order to restore power to said load when said open state is detected.

12. A circuit interrupter apparatus as claimed in claim 11, wherein said external condition includes a shock or vibration.

13. A method for detecting faults in a load connected to a line monitoring device and a line interrupter circuit, said method for detecting faults comprising:

initiating a fault signal from said microcontroller;

detecting said fault signal at said line monitoring device;

sending an input signal to said microcontroller to initiate said line interrupter circuit; and sensing a signal from a contact detector circuit, said contact detector circuit having an input to said microcontroller.

14. A method for detecting faults in a load connected to a line monitoring device and a line interrupter circuit, comprising operating a manual test device, said method for detecting faults further comprising:

initiating a signal via said manual test device connected to a driver circuit, said signal inducing a fault condition via said driver circuit;

sensing said fault condition by said line monitoring device;

indicating said fault condition to a microcontroller; and sensing a signal from a contact detector circuit having an input to said microcontroller.

15. A method for detecting faults in an electrical load connected to a line monitoring device and a line interrupter circuit, said method for detecting faults comprising:

receiving and processing input signals by a microcontroller in response to activation of a manual test switch coupled to an input of said microcontroller;

initiating said line monitoring device to generate the occurrence of a fault in said electrical load; and operating said line interrupter circuit when said fault is detected.

16. A method for maintaining power to an electrical load despite external conditions causing an open circuit state comprising:

receiving and processing inputs from a line monitoring device by a microcontroller;

determining if the load is in open state due to an external condition not relating to the load; and operating a line interrupter circuit in order to restore power to the load when said open circuit state is detected.

17. A circuit interrupter apparatus for detecting faults in a load connected to a line monitoring device and a line interrupter circuit, said circuit interrupter apparatus comprising:

a microcontroller connected to said line monitoring device and to said line interrupter circuit, said microcontroller being programmable to receive and process inputs from said line monitoring device to determine the occurrence of a ground fault in said load, to operate said line interrupter circuit when said ground fault is detected; and an indicator, wherein said microcontroller being connected to said line monitoring device, said line interrupter circuit and said indicator, said microcontroller being programmable to receive and process inputs from said line monitoring device to determine the occurrence of a fault, and to operate said line interrupter circuit when said fault is detected; wherein said microcontroller is further programmable to operate said indicator to provide notification upon detection by said microcontroller of the occurrence of at least one of a plurality of conditions including successful completion of a self-test, successful completion of a manual test, unsuccessful completion of said self-test, unsuccessful completion of said manual test, the need for a user to initiate said manual test, testing of said line interrupter to ensure proper function thereof, and testing power to said microcontroller to determine whether a reverse line load condition exists.

18. A circuit interrupter apparatus for detecting faults in a load connected to a line monitoring device and a line interrupter circuit, said circuit interrupter apparatus comprising:

a microcontroller connected to said line monitoring device and to said line interrupter circuit, said microcontroller being programmable to receive and process inputs from said line monitoring device to determine the occurrence of a ground fault in a load, and to operate said line interrupter circuit when said ground fault is detected;

a manual test device comprising a manual test switch connected to a driver circuit, said driver circuit being connected to said line monitoring device and being operable in response to activation of said manual test switch to induce a fault condition that is detected by said line monitoring device and indicated to said microcontroller by said inputs; and an indicator, wherein said microcontroller being connected to said line monitoring device, said line interrupter circuit and said indicator, said microcontroller being programmable to receive and process inputs from said line monitoring device to determine the occurrence of a fault, and to operate said line interrupter circuit when said fault is detected; wherein said microcontroller is further programmable to operate said indicator to provide notification upon detection by said microcontroller of the occurrence of at least one of a plurality of conditions comprising: successful completion of a self-test, successful completion of a manual test, unsuccessful completion of said self-test, unsuccessful completion of said manual test, the need for a user to initiate said manual test, testing of said line interrupter to ensure proper function thereof, and testing power to said microcontroller to determine whether a reverse line load condition exists.

19. A circuit interrupter apparatus for detecting faults in a load connected to a line monitoring device and a line interrupter circuit, said circuit interrupter apparatus comprising:

a microcontroller connected to said line monitoring device and to said line interrupter circuit, said microcontroller being programmable to receive and process inputs from said line monitoring device to determine the occurrence of a ground fault in said load, to operate said line interrupter circuit when said ground fault is detected; and an indicator, wherein said indicator comprises an LED, wherein said microcontroller being connected to said line monitoring device, said line interrupter circuit and said indicator, said microcontroller being programmable to receive and process inputs from said line monitoring device to determine the occurrence of a fault, and to operate said line interrupter circuit when said fault is detected; wherein said microcontroller is further programmable to operate said indicator to provide notification upon detection by said microcontroller of the occurrence of at least one of a plurality of conditions including successful completion of a self-test, successful completion of a manual test, unsuccessful completion of said self-test, unsuccessful completion of said manual test, the need for a user to initiate said manual test, testing of said line interrupter to ensure proper function thereof, and testing power to said microcontroller to determine whether a reverse line load condition exists.

20. A circuit interrupter apparatus for detecting faults in a load connected to a line monitoring device and a line interrupter circuit, said circuit interrupter apparatus comprising:

a microcontroller connected to said line monitoring device and to said line interrupter circuit, said microcontroller being programmable to receive and process inputs from said line monitoring device to determine the occurrence of a ground fault in a load, and to operate said line interrupter circuit when said ground fault is detected;

a manual test device comprising a manual test switch connected to a driver circuit, said driver circuit being connected to said line monitoring device and being operable in response to activation of said manual test switch to induce a fault condition that is detected by said line monitoring device and indicated to said microcontroller by said inputs; and an indicator, wherein said indicator comprises an LED, wherein said microcontroller being connected to said line monitoring device, said line interrupter circuit and said indicator, said microcontroller being programmable to receive and process inputs from said line monitoring device to determine the occurrence of a fault, and to operate said line interrupter circuit when said fault is detected; wherein said microcontroller is further programmable to operate said indicator to provide notification upon detection by said microcontroller of the occurrence of at least one of a plurality of conditions comprising: successful completion of a self-test, successful completion of a manual test, unsuccessful completion of said self-test, unsuccessful completion of said manual test, the need for a user to initiate said manual test, testing of said line interrupter to ensure proper function thereof, and testing power to said microcontroller to determine whether a reverse line load condition exists.

21. A circuit interrupter apparatus for detecting faults in a load connected to a line monitoring device and a line interrupter circuit, said circuit interrupter apparatus comprising:

a microcontroller connected to said line monitoring device and to said line interrupter circuit, said microcontroller being programmable to receive and process inputs from said line monitoring device to determine the occurrence of a ground fault in said load, to operate said line interrupter circuit when said ground fault is detected, wherein said microcontroller is programmed to perform at least one self-test, said microcontroller operates said line interrupter circuit regardless of said inputs, said ground fault circuit interrupter apparatus conducting said at least one self-test by said microcontroller initiating said fault, said line monitoring device detecting said fault, and said line monitoring device sending an input to said microcontroller, and wherein said microcontroller initiates said line interrupter circuit.

22. A circuit interrupter apparatus for detecting faults in a load connected to a line monitoring device and a line interrupter circuit, said circuit interrupter apparatus comprising:

a microcontroller connected to said line monitoring device and to said line interrupter circuit, said microcontroller being programmable to receive and process inputs from said line monitoring device to determine the occurrence of a ground fault in a load, and to operate said line interrupter circuit when said ground fault is detected;

a manual test device comprising a manual test switch connected to a driver circuit, said driver circuit being connected to said line monitoring device and being operable in response to activation of said manual test switch to induce a fault condition that is detected by said line monitoring device and indicated to said microcontroller by said inputs, wherein said microcontroller is programmed to perform at least one self-test, said microcontroller operates said line interrupter circuit regardless of said inputs, said ground fault circuit interrupter apparatus conducting said at least one self-test by said microcontroller initiating said fault, said line monitoring device detecting said fault, and said line monitoring device sending an input to said microcontroller, and wherein said microcontroller initiates said line interrupter circuit.

23. A circuit interrupter apparatus for detecting faults in a load connected to a line monitoring device and a line interrupter circuit, said circuit interrupter apparatus comprising:

a microcontroller connected to said line monitoring device and to said line interrupter circuit, said microcontroller being programmed to receive and process inputs from said line monitoring device to determine if said load is in open state due to an external condition not relating to the load, and to operate said line interrupter circuit in order to restore power to said load when said open state is detected, wherein said external condition includes a shock or vibration.

* * * * *